Oct. 7, 1947.                    J. C. SHAW                     2,428,472
    TRACER FOR ELECTRICALLY OPERATED AND CONTROLLED DUPLICATING MACHINES
                        Filed July 9, 1945         2 Sheets-Sheet 2
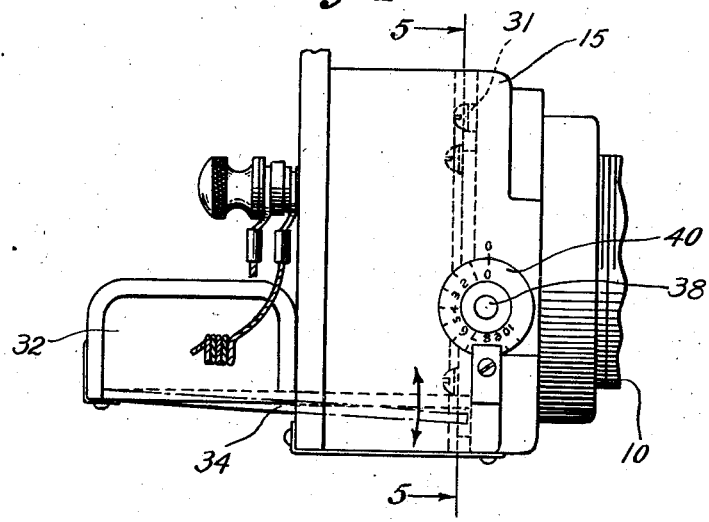
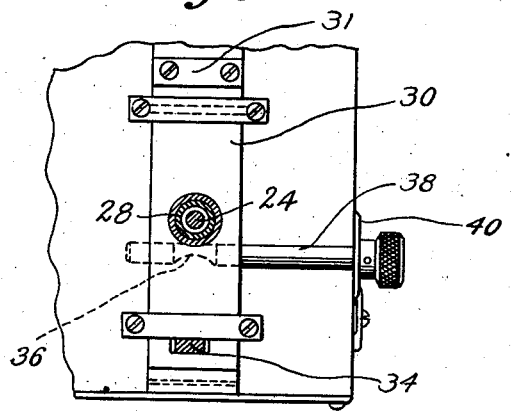
INVENTOR.
J. C. Shaw
BY
ATTORNEY Patented Oct. 7, 1947

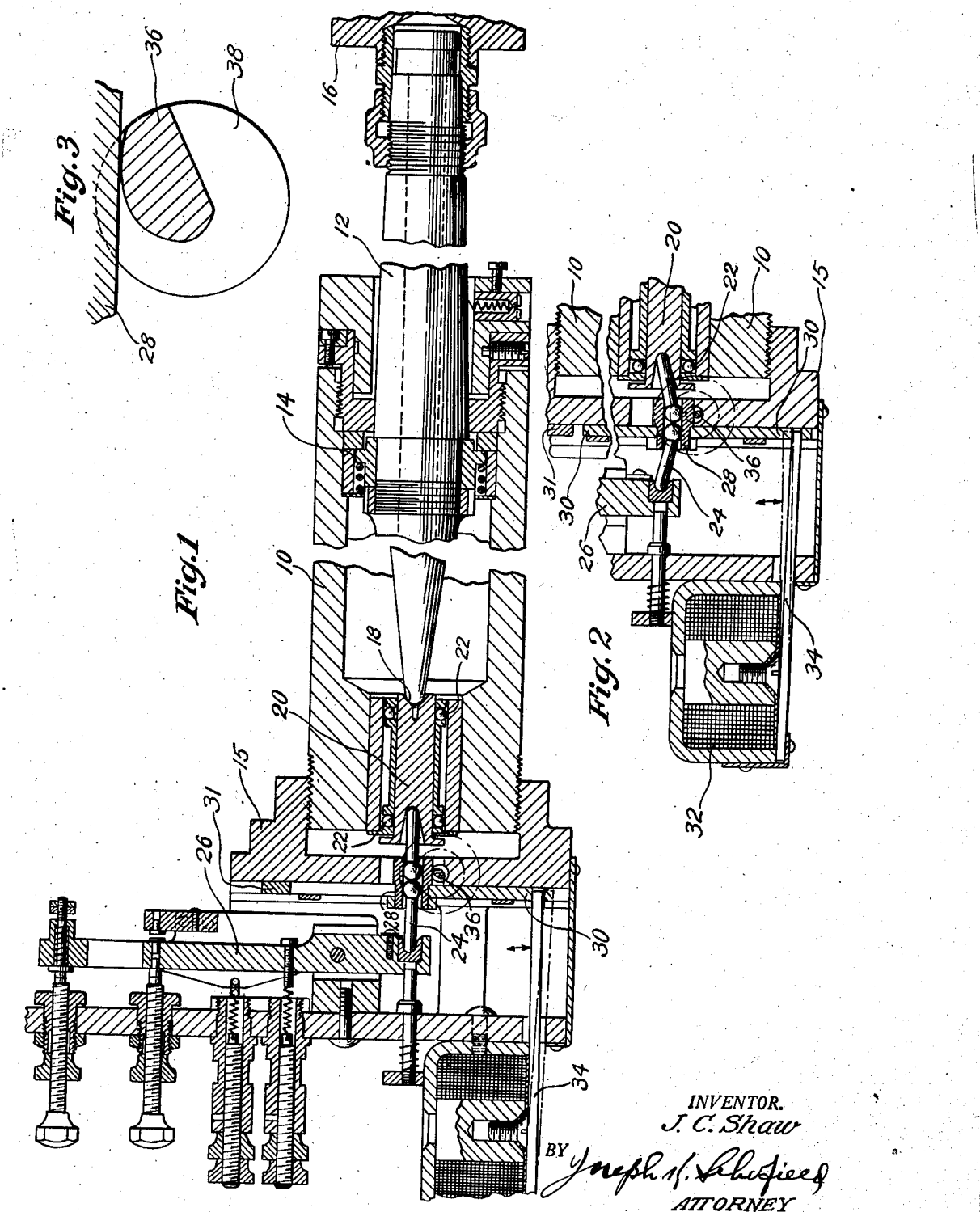

2,428,472

UNITED STATES PATENT OFFICE 2,428,472

TRACER FOR ELECTRICALLY OPERATED AND CONTROLLED DUPLICATING MACHINES

John C. Shaw, Bloomfield, Conn., assignor to Niles-Bement-Pond Company, West Hartford, Conn., a corporation of New Jersey Application July 9, 1945, Serial No. 603,918

5 Claims. (Cl. 90—62)

This invention relates to tracer controlled reproducing machines and particularly to means for improving the contact closing operation of the tracer, the limits of movement of the contact carrying arm to open and close the contacts being varied by slight adjustable movements of a toggle member between the tracer lever and contact carrying arm.

The primary object of the invention is to effect improved operation of the duplicating machine by slightly varying the effective length of the tracer lever as the tracer traverses the different portions of the template.

A feature that enables the above object to be accomplished is that the operating position of the contact carrying arm relative to the fixed contacts may be shifted slightly by electrically controlled means, the amount of shift being variable and adjustable to equal or substantially equal the gap between which the contact carrying arm operates to close contact with its cooperating normally fixed contacts.

Another feature of importance is that the amount of shift of the contact carrying arm can be regulated by means of a suitably shaped cam, the position of which may be manually adjusted to vary the amount of shift over its maximum range.

Another object of importance of the invention is to effect the shift by means of toggle members between the end of the tracer lever and the contact carrying arm, the amount of shift being effected by varying the permitted lateral deflection of the members forming the toggle joint from their straight line position.

With the toggle members in their straight line position the effective length of the tracer spindle is at its maximum and the tracer lever operates adjacent one of the normally fixed contacts. When the toggle members are moved by the shift mechanism to their oblique or angular position the tracer lever operates adjacent the opposite normally fixed contact.

And finally it is an object to provide an electromagnet energized as required during operation of the machine to move the toggle members from their straight line to their oblique positions, the amount moved by the toggle members being controlled by manually adjustable means, the magnet being controlled by its circuit to effect movements of the toggle members and contact carrying arm in accordance with movements of the tracer relative to its model.

With the above and other objects in view, the invention includes the features of construction and operation set forth in the following specification and illustrated in the accompanying drawing.

In the accompanying drawing annexed hereto and forming a part of this specification, I have shown the invention embodied in a standard form of automatic tracer for form reproducing machines of the Keller type, but it will be understood that the invention can be otherwise embodied and that the drawing is not to be construed as defining or limiting the scope of the invention, the claims appended to this specification being relied upon for that purpose.

In the drawing:

Figure 1 is a central longitudinal sectional view of a complete tracer of the automatic type showing the mechanism forming the present invention in one of its normal operative positions.

Fig. 2 is a fragmentary sectional view taken upon a similar plane and showing the toggle members forming parts of the mechanism in another operative position.

Fig. 3 is an enlarged view showing the outline of a cam forming part of the invention.

Fig. 4 is a side elevation of a portion of the tracer casing showing the toggle member adjusting means, and Fig. 5 is a cross sectional view of the parts shown in Fig. 4, the section being taken on the plane of the line 5—5.

In the above mentioned drawing there has been shown but one embodiment of the invention which is now deemed preferable, but it is to be understood that changes and modifications may be made within the scope of the appended claims without departing from the spirit of the invention.

Briefly, and in its preferred aspect, the invention may include the following principal parts: First, a tracer body member or casing having a universally movable model-following tracer lever mounted therein; second, a slidable member within the tracer body moved axially when the tracer lever is moved in any direction; third, a contact carrying arm pivotally mounted on a fixed axis within the tracer body, movements of which will open and close adjustable but normally fixed contacts associated therewith; fourth, a toggle joint connecting the slidable member and the contact carrying arm and mounted to permit limited lateral movement of the adjacent ends of its members; fifth, a sleeve enclosing the intermediate portions of the toggle members, said sleeve being movable laterally predetermined distances; sixth, a cam to vary this lateral movement of the sleeve, and seventh, a magnet to effect movements of the sleeve and toggle members in one direction.

Referring more in detail to the figures of the drawing, there is shown a tracer body 10 in the form of an elongated sleeve within which is mounted a tracer lever 12 of the usual type. As shown, the tracer lever 12 is mounted at an intermediate point 14 of its length for movement in any direction about its support and may also move a slight distance axially within the tracer body. At the forward or outside end of the tracer lever 12 may be mounted a model or template engaging member 16 and at the inner end is formed a ball point 18 in engagement with a conical or other form of recess in an axially movable member 20.

This axially movable member 20 may preferably be supported upon suitable ball bearings 22 for limited but free axial movement within the tracer body. At the rear end of this axially movable member 20 is a deep recess within which is mounted one end of one of a pair of toggle members 24, the opposite end of the opposite toggle member being set into a recess on the contact carrying arm 26. The intermediate or adjacent portions of the toggle members 24 are provided with enlarged spherical ends and are normally held in abutment with each other. These spherical ends are held within a sleeve member 28 closely but slidably fitting their periphery and permitting limited oblique movement of the intermediate portions of the toggle members 24. Members 24 are moved to predetermined adjustable oblique positions when the sleeve 28 is moved laterally by movement of its slide or plate 30.

In order to effect movements of these adjacent ends of the toggle members 24 the plate 30 is provided within the tracer head 15, the plate having an opening closely fitting the sleeve 28 and movable within limited distances laterally of the tracer spindle axis. A fixed stop 31 may be provided for the plate 30 so that when the magnet 32 is energized the toggle members 24 are maintained in their alined position. To effect movements of this sleeve 28 and the toggle member 24 magnet 32 is provided having an armature 34, the free or outer end of which is adapted to engage a slot cut into one end of the plate 30. In the one position of the armature 34 when the magnet 32 is energized, the plate 30 and sleeve 28 are held in a position to position the toggle members 24 substantially in alinement with each other. When the magnet 32 is released, however, the plate 30 drops to move the sleeve 28 and move the toggle members 24 to their oblique position shown in Fig. 2. This movement of the toggle members 24 in effect reduces the over-all distance between the intermediate support for the tracer lever 12 and the recess for one of the toggle members 24 formed within the contact carrying arm 26.

To vary the lateral movement of the sleeve 30 and the toggle members 24 and to limit this movement of the members 24 from their straight line position, a cam 36 is provided formed preferably on the inner end of an elongated rod 38. The cam surface 36 on the periphery of this rod engages the cylindrical surface of the sleeve 28 and different rotative positions of the cam 36 and rod 38 permit greater or less lateral movement of the sleeve 30 before taking up against the cam surface.

In order to effect movements of the cam 36 to control lateral movements of the sleeve 28 and to also indicate the amount of lateral movement permitted the sleeve 30, the rod 38 carrying the cam 36 is provided at its outer end with a head or knob 40. Graduations are provided on or adjacent the knob 40 for rotation with the rod 38 so that when the cam 36 is adjusted by rotation of the rod the movement laterally of the sleeve and toggle members permitted with that adjustment of the cam will be indicated.

To energize the magnet 32 its coil may be connected to the circuits controlling movements of the machine so that as required the contact arm 26 may be shifted for movements between different limits. With the toggle members 24 in their straight line position and with the tracer lever 12 in its central or neutral position the contact carrying arm 26 will be oscillated between definite extreme positions by movements in any direction of the tracer lever 12. When the toggle members 24 are in an oblique position the limits of movements of the contact carrying arm 26 are slightly shifted by corresponding movements of the tracer lever 12.

What I claim is:

1. A tracer for electrically controlled duplicating machines, a tracer body having a universally movable lever therein, a contact carrying arm actuated by movement of said lever, toggle members disposed between said tracer lever and arm, and means to actuate said toggle members to oblique positions to vary the position of said arm with respect to the tracer lever.

2. A tracer for electrically controlled duplicating machines, a tracer body having a universally movable lever therein, a contact carrying arm actuated by movement of said lever, toggle members disposed between said tracer lever and arm, and means to actuate said toggle members to variable predetermined oblique positions to vary the position of said arm with respect to the tracer lever.

3. A tracer for electrically controlled duplicating machines, a tracer body having a universally movable lever therein, a contact carrying arm actuated by movement of said lever in any direction, toggle members disposed between said tracer lever and arm and having their outer ends in contact with said lever and arm respectively, a sleeve enclosing the adjacent ends of said toggle members, and means to move said sleeve laterally to actuate said toggle members to oblique positions to vary the position of said arm with respect to the tracer lever.

4. A tracer for electrically controlled duplicating machines, a tracer body having a universally movable lever therein, a contact carrying arm actuated by movement of said lever, toggle members disposed between said tracer lever and arm, and an electromagnet to actuate said toggle members to oblique positions to vary the position of said arm with respect to the tracer lever.

5. A tracer for electrically controlled duplicating machines, a tracer body having a universally movable lever therein, a contact carrying arm actuated by movement of said lever, toggle members disposed between said tracer lever and arm, and an electromagnet retaining said toggle members in one position and permitting said toggle members to move to another position when not energized.

JOHN C. SHAW.

REFERENCES CITED

The following references are of record in the file of this patent:

UNITED STATES PATENTS

| Number | Name | Date |
|---|---|---|
| 2,036,362 | Sessen | Apr. 7, 1936 |
| 2,107,063 | Roehm | Feb. 1, 1938 |
| 2,395,525 | Wilkie | Feb. 26, 1946 |
| 2,162,491 | Rosen | June 13, 1939 |
| 2,216,924 | Rosen | Oct. 8, 1940 |
| 2,249,413 | Bechtle | July 15, 1941 |
| 2,007,899 | Shaw | July 9, 1935 |